Figure 1:
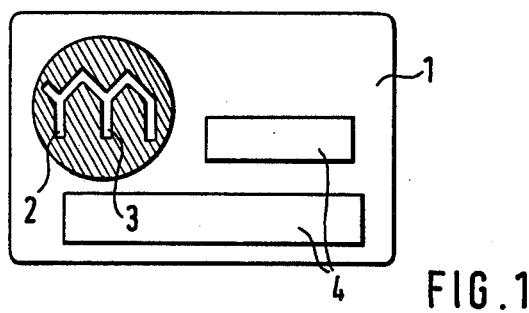

United States Patent [19]

Haghiri-Tehrani

[11] Patent Number: 4,711,690
[45] Date of Patent: Dec. 8, 1987

[54] METHOD FOR MAKING AN IDENTIFICATION CARD HAVING FEATURES FOR TESTING IN INCIDENT AND TRANSMITTED LIGHT

[75] Inventor: Yahya Haghiri-Tehrani, Munich, Fed. Rep. of Germany

[73] Assignee: GAO Gesellschaft fur Automation und Organisation mbH, Munich, Fed. Rep. of Germany

[21] Appl. No.: 809,854

[22] Filed: Dec. 18, 1985

Related U.S. Application Data

[63] Continuation of Ser. No. 521,264, Aug. 8, 1983, abandoned.

[30] Foreign Application Priority Data

Aug. 24, 1982 [DE] Fed. Rep. of Germany ....... 3231460

[51] Int. Cl.⁴ .......................... B32B 5/00; B32B 27/00
[52] U.S. Cl. .................................. 156/309.6; 156/277; 264/1.7; 264/132; 283/91; 283/110; 283/904; 428/916
[58] Field of Search ................... 156/212, 214, 244.12, 156/244.16, 277, 298, 306.6, 309.6, 324.4; 428/67, 916; 40/626, 628; 283/110, 113, 904, 85, 87, 91; 264/1.7, 132

[56] References Cited

U.S. PATENT DOCUMENTS

| | | | |
|---|---|---|---|
| 2,071,921 | 2/1937 | Dickson | 264/156 |
| 3,604,901 | 9/1971 | Morita et al. | 283/904 X |
| 3,876,484 | 4/1975 | Kuhns | 156/309.6 X |
| 3,884,554 | 5/1975 | Lemelson | 350/164 |
| 3,930,924 | 1/1976 | Oka et al. | 156/277 X |
| 3,967,400 | 7/1976 | Otto | 283/91 |
| 4,100,011 | 7/1978 | Foote | 156/277 X |
| 4,307,899 | 12/1981 | Hoppe | 283/91 X |
| 4,313,984 | 2/1982 | Moraw et al. | 156/298 X |
| 4,469,725 | 9/1984 | Fischer et al. | 428/916 X |
| 4,506,916 | 3/1985 | Kuhl | 283/91 |

FOREIGN PATENT DOCUMENTS

| | | |
|---|---|---|
| 488652 | 4/1976 | Australia . |
| 0059856 | 9/1982 | European Pat. Off. . |
| 2842972 | 6/1980 | Fed. Rep. of Germany . |
| 92488 | 10/1968 | France . |
| 54-11972 | 1/1979 | Japan .............................. 156/309.6 |
| 1552853 | 9/1979 | United Kingdom . |

Primary Examiner—Donald E. Czaja
Assistant Examiner—Ramon R. Hoch
Attorney, Agent, or Firm—Stevens, Davis, Miller & Mosher

[57] ABSTRACT

The multilayer identification card comprises several synthetic layers compounded by the effects of heat and pressure. An inside interface of at least one of these layers exhibits depressions which are filled with the material of the adjacent layer during the laminating process. The adjacent layers are selected in such a way that they are of different transparency. Thus a light and shadow effect is produced in incident light which is reversed in transmitted light.

13 Claims, 9 Drawing Figures

METHOD FOR MAKING AN IDENTIFICATION CARD HAVING FEATURES FOR TESTING IN INCIDENT AND TRANSMITTED LIGHT

This application is a continuation of application Ser. No. 521,264 filed Aug. 8, 1983, now abandoned.

The invention relates to an identification card having several layers of synthetic material connected with each other by the effect of heat and pressure, and features in the form of patterns or characters whose light/dark contrast is reversed when subjected to transmitted light instead of incident light, and a method of producing same.

German Patent No. 29 01 150 discloses an identification card of synthetic material bearing features for testing in incident and transmitted light. For this purpose, one layer of the identification card is provided with several printed layers which partially overlap each other and show a pattern in which the surface areas where the printed layers overlap appear lighter than the surrounding areas in incident light, but darker than the surrounding areas in transmitted light.

In the case of this identification card, the realization of several shades of lightness is connected with several printing processes. Furthermore, printing inks should be used which combine well with the relevant layers of the identification card.

The problem on which the invention is based is to provide an identification card of synthetic material having a feature for testing in incident and transmitted light, which can be produced in a rational manner without facilitating the imitation of the feature.

The problem is solved by the features contained in the characterizing part of the main claim.

It is true that British Patent No. 565 708 discloses the production of bank-notes of synthetic material whereby recesses are provided in a synthetic layer with a dyed filling material to show characters (for example, the bank-note value) and the characters shown in this way may also be protected by a cover film.

In this way characters may in fact be applied visibly to a synthetic carrier, but no reversal of contrast can be achieved when observed in incident and transmitted light.

In the case of the inventive identification card, depressions in one layer are filled with the material of an adjacent layer so that the two layers vary in thickness locally after lamination. If one of these layers has less transparency than the other layer, a light and shadow effect is created in incident light which is reversed in transmitted light.

The pattern created by the form of the depressions may be very finely structured, additionally impeding the imitation of the pattern although the production process itself still remains rational.

In certain areas, for example, the depressions may be filled only partially. In accordance with the properties of the material and the production conditions for the card it is then possible to make the patterns or characters totally reflecting, very glossy or else mat, and the mat surfaces may exhibit a surface relief which may be felt tactilely and is congruent to the structure of the depressions.

In a development of the invention, the layer which is deformed is provided with an overprint which is also deformed plastically in accordance with the depressions in the adjacent layer. Thus, a three-dimensional impression of the printed pattern is obtained since it is present in different planes of the identification card due to the deformation. Using an appropriate combination of the printed pattern with the structure of the depressions, a number of optical effects may be achieved, for example distorted lines or marks in the overprint which may only be seen at certain angles.

Furthr features and advantages of the invention can be seen in the following description dealing with embodiments of the invention with reference to the adjoined drawings. These show:

FIG. 1 an embodiment of the inventive identification card when observed in incident light.

Figure 2:
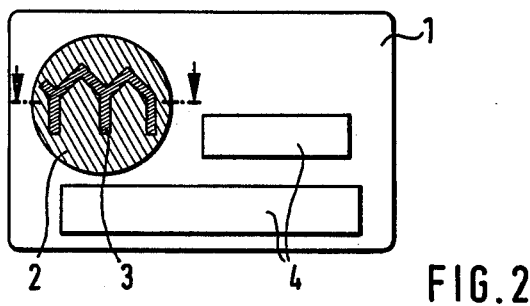

FIG. 2 an embodiment of the inventive identification card when observed in transmitted light.

Figure 3:
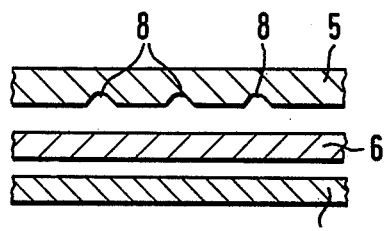
Figure 4:
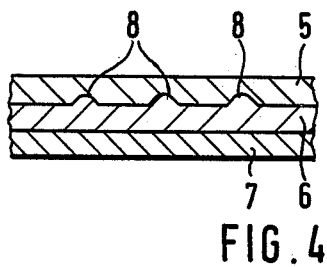

FIGS. 3, 4 the identification card shown in FIGS. 1 and 2 before and after lamination.

Figure 5:
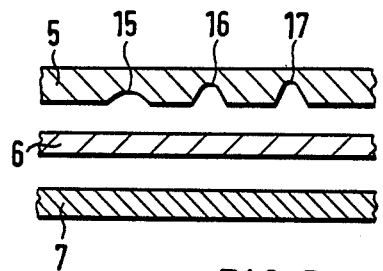
Figure 6:
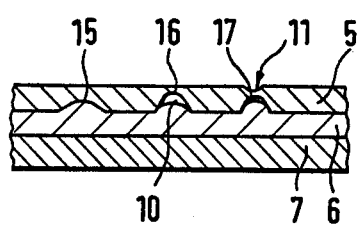

FIGS. 5, 6 a further embodiment of an identification card before and after lamination.

Figure 7:
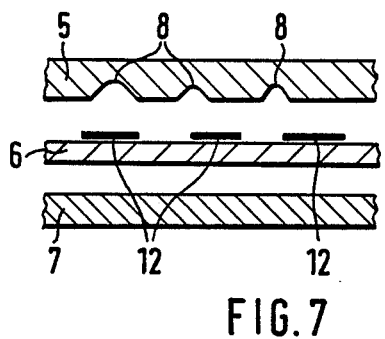
Figure 8:
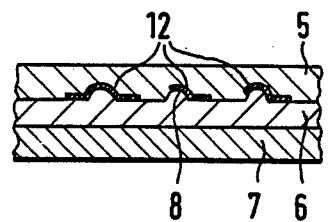

FIGS. 7, 8 an identification card with an embedded printed pattern before and after lamination.

Figure 9:
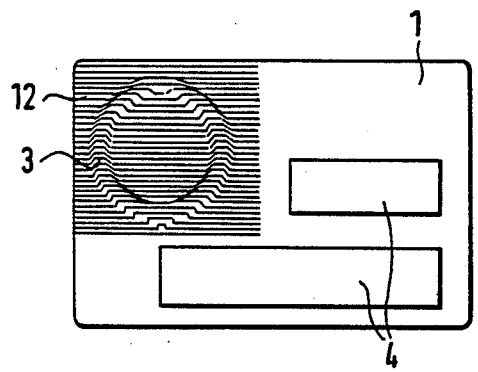

FIG. 9 an identification card with a printed pattern seen from the top.

FIGS. 1 and 2 shown an exemplary embodiment of an identification card having, along with fields 4 containing the usual written information, a field 2 with a pattern 3 designed according to the invention. While FIG. 1 shows pattern 3 as seen by an observer in incident light, FIG. 2 shows the same pattern when observed in transmitted light. The production of the identification card and its construction in the area of the pattern, as well as developments of the invention, shall be explained in the following.

FIGS. 3 and 4 show cross-section views of the identification card of FIGS. 1 and 2 before and after lamination. The card comprises layers 5, 6 and 7. Layer 5 is tranparent and provided on the side facing towards the inside of the card with depressions 8 representing the desired pattern in the finished card. The depressions, and thus the pattern, may be structured very finely and elaborately (although this is not shown in the figures), thereby rendering its imitation very difficult or even impossible. For the production of such depressions or patterns there are several appropriate methods, for example, the embossing-molding technique or etching technique. Unlike synthetic layer 5, layer 6 has less transparency and is dyed white, for example, whereas layer 7 may in turn be a transparent layer.

When layers 5, 6 and 7 are laminated by the effects of heat and pressure, depressions 8 are filled with the material of the opaque, white layer 6 adjacent to the depressions (FIG. 4). In the case of particularly finely structured depressions or patterns which are to retain their full extent after the laminating process, a material having a lower softening temperature relative to layer 5 with depressions 8 should preferably be used for layer 6.

When the card is observed in incident light, as shown in FIG. 1, the areas of field 2, in which layer 6 is of a greater thickness, appear lighter or more intensely colored than the surroundings with lesser layer thickness, so that pattern 3 stands out against the surroundings by virtue of its lightness. Furthermore, the plastic deformation of the surface of layer 6 and the resulting light and shadow effect arouse a three-dimensional impression. In transmitted light, on the other hand (see FIG. 2), the thicker areas appear darker than the surroundings due to the reduced transparency in these areas, so that in this case pattern 3 stands out against the surroundings by virtue of its darkness. Thus the card exhibits a pattern showing a reversal of contrast when observed in incident and transmitted light. In the embodiment explained, transparent layer 5 is provided with the depressions representing the pattern. It is also possible to provide layer 6, which is of lesser transparency, with corresponding depressions in a card laminate. One layer of the card laminate may also be provided on both sides with depressions.

FIGS. 5 and 6 show the layer construction of a further embodiment of the invention before and after lamination. Depressions 15, 16, 17 of transparent layer 5 are of varying depth in this case. The variable thickness differences resulting in the laminating card cause the pattern to appear, both in incident and in transmitted light, in several shades of lightness or color saturation which may run into each other more or less continuously.

Furthermore, there is the possibility in this embodiment, if corresponding materials are selected and the pressure and temperature are suitably controlled during the laminating period, of filling the depressions, at least in one area of the pattern, only partly with the material of the adjacent layer. When depressions 16, 17 are only partly filled, for example, hollows 10 are created, as shown in FIG. 6, between layers 5 and 6, these hollows evoking different optical effects, unlike completely filled depressions, for example 15. The particular shape of the interfaces of layers 5 and 6 and the different indices for calculating the layers and the hollows may lead to light being totally reflected in these areas so that the identification card exhibits, at least in some areas of the pattern, a glossy design congruent to the pattern. If the laminating process is ended before the depressions in the film are completely filled in by the material of the adjacent film, or if the laminating pressure is reduced locally in the area of the depressions in such a way that complete filling of the pattern areas is prevented, not only hollows inside the card congruent to the pattern are obtained, but also local sinking in the film surface which is also congruent to the pattern. These depressions 11 (FIG. 6), which may be felt on the card surface, stand out particularly well as a mat pattern against the otherwise slick film surface of the surroundings when high-gloss laminating plates are used. This effect, like the light and dark tilting effect already described, is easily testable as a property characteristic of the card in the light reflecting on the card surface, without any additional means.

Finally, FIGS. 7 and 8 show an embodiment of the invention in which middle layer 6, for example, which has less transparency than the other layers, is provided with a printed pattern 12. The printed pattern is placed on the synthetic layer in such a way that it is pressed into the depressions of the adjacent layer along with the material of this layer 6. This deformation further increaess the three-dimesional impression already evoked by the pattern, as mentioned. FIG. 9, showing an identification card seen from the top, conveys the threedimensional effect of a printed pattern which has been accordingly deformed by the depressions in the card, as described above.

The depressions in a card layer may be arranged relative to the position of an appropriately selected printed pattern in such a way that portions of the printed pattern are pushed into a plane which is higher with respect to the front of the card. At a certain angle of observation, only the raised areas of the printed pattern can then be seen whereas the entire printed pattern is visible when looked at normally.

It is also possible to provide, instead of the printed layer, an electrically conductive or a magnetic layer, for example, which is deformed by the depressions during lamination of the card. The physical changes resulting from this deformation may be used, for example, for showing a code which may be scanned by aid of capacitive scanners or by means of a magnetic head.

I claim:

1. A method of producing an identification card comprising the steps of
   providing at least two layers of synthetic material, said layers differing with respect to transparency and softening temperature;
   providing at least one surface of the layer having the higher softening temperature with a relief structure without throughgoing openings said structure corresponding to a pattern or characters and said relief structure being provided by either excavation or deformation of said layer up to a certain depth;
   superposing said at least two layers such that the at least one surface of the layer being provided with said relief structure is adjacently situated to said layer having the lower softening temperature;
   applying heat and pressure all over the surface of the superposed layers for laminating said layers, wherein the heat is applied such that the temperature within the superposed layers during the laminated process is higher than the softening temperature of the layer having the lower softening temperature but said temperature being lower than the softening temperature of the layer being provided with said relief structure such that the layer having the lower softening temperature equalizing said relief structure by at least partially filling impressions of the surface relief structure such that the laminated structure has a constant thickness with respect to its outer dimensions, said layers having different transparencies locally varying with respect to the thickness such that when subjected to transmitted light the areas of greater thickness within the layer of less transparency appear to be darker than the surrounding areas whereas when subjected to incident light said areas having a higher color-intensity than the surrounding areas and wherein said layers are provided within said identity card such that the relief structure is covered at one face thereof only by transparent layers such that said relief structure is visible from the outside of the card.

2. A method of producing an identification card comprising the steps of
   providing at least two layers of synthetic material, said layers differing with respect to transparency and softening temperature;
   providing at least one surface of the layer having the higher softening temperature with a relief structure without throughgoing openings, said structure corresponding to a pattern or characters and said relief structure being provided by either excavation or deformation of said layer up to a certain depth;
   providing the layer having the lower softening temperature with a pattern of either magnetically or electrically conductive coating;
   superposing said at least two layers such that the at least one surface of the layer being provided with said relief structure is adjacently situated to said layer having the lower softening temperature and such that said coatingpattern is situated between said at least two layers;

applying heat and pressure all over the surface of the layers for laminating said layers, wherein the heat is applied such that the temperature within the superposed layers during the laminating process is higher than the softening temperature of the layer having the power softening temperature but said temperature being lower than the softening temperature of the layer being provided with said relief structure such that the layer having the lower softening temperature equalizes said relief structure by at least partially filling impressions of the surface relief structure and such that said coating-pattern is distorted in accordance with said relief structure and such that the laminated structure has a constant thickness with respect to its outer dimensions, said layers having different transparencies locally varying with respect to the thickness such that when subjected to transmitted light the areas of greater thickness within the layer of less transparency appear to be darker than the surrounding areas whereas when subjected to incident light said areas having a higher color intensity than the surrounding areas, and wherein said layers are provided within said identity card such that said relief structure is covered at one face thereof only by transparent layers such that said relief structure and said distorted coating-pattern is visible from the outside of the card.

3. A method of producing an identification card comprising the steps of providing at least two layers of synthetic material, said layers differing with respect to transparency and softening temperature;

providing one surface of the layer having the lower softening temperature with a pattern of magnetically or electrically conductive coating;

providing said surface of higher softening temperature being provided with said pattern with a relief structure without throughgoing openings whereby said coatingpattern is distorted in accordance with said relief structure;

superposing said at least two layers such that their surface being provided with said relief structure is adjacently situated to said layer having the lower softening temperature such that the coating-pattern is situated between said two layers;

applying heat and pressure all over the surface of the superposed layers for laminating said layers, wherein the heat is applied such that the temperature within the superposed layers during the laminating process is higher than the softening temperature of the layer having the lower softening temperature but said temperature being lower than the softening temperature of the layer being provided with said relief structure such that the layer having the lower softening temperature equalizes said relief structure but at least partially filling impressions of the surface relief structure such that the laminating structure has a constant thickness with respect to its outer dimensions, said layers having different transparencies locally varying with respect to their thickness wherein said layers are provided within said identity card such that the relief structure is covered at one face thereof only by transparent layers such that said relief structure is visible from the outside of the card.

4. A method of producing an identification card comprising the steps of providing at least two layers of synthetic material, said layers differing with respect to softening temperature;

providing at least one surface of the layer having the higher softening temperature with a relief structure without throughgoing openings, said structure corresponding to a pattern or characters and said relief structure being provided by either excavation or deformation of said layer up to a certain depth;

providing one face of the layer having the lower softening temperature with a pattern of magnetically or electrically conductive coating;

superposing said at least two layers such that the at least one surface of the layer being provided with said relief structure is adjacently situated to said layer having the lower softening temperature and such that the coatingpattern is situated between said two layers;

applying heat and pressure all over the surface of the superposed layers for laminating said layers, within the heat is applied such that the temperature within the superposed layers during the laminating process is higher than the softening temperature of the layer having the lower softening temperature but said temperature being lower than the softening temperature of the layer being provided with said relief structure such that the layer having the lower softening temperature equalizes said relief structure and simultaneously distorts said coating-pattern in accordance with said relief structure by at least partially filling impressions of the surface relief structure such that the laminated structure has a constant thickness with respect to its outer dimension, said layers locally varying with respect to the thickness and wherein said layers are provided within said identity card such that said relief structure is covered at one face thereof only by transparent layers and such that said relief structure and said distorted coating-pattern is visible from the outside of the card.

5. The method as in claim 1, wherein the depressions are present in a transparent layer and the other layer is translucent.

6. The method as in claim 2, wherein the depressions are present in a transparent layer and the other layer is translucent.

7. The method as in claim 3, wherein the depressions are present in a transparent layer and the other layer is translucent.

8. The method as in claim 1, wherein the shape and size of the depressions, on the one hand, and the laminating conditions and properties of the material of the synthetic layers, on the other hand, are coordinated with each other in such a way that the material of the second synthetic layer does not completely fill in the depressions in the first synthetic layer when it flows into them, so that the patterns or numbers may be felt or seen as a surface relief, as nonglossy, mat areas and/or in the form of enclosed, totally reflecting air spaces.

9. The method as in claim 2, wherein the shape and size of the depressions, on the one hand, and the laminating conditions and properties of the material of the synthetic layers, on the other hand, are coordinated with each other in such a way that the material of the second synthetic layer does not completely fill in the depressions in the first synthetic layer when it flows into them, so that the patterns or numbers may be felt or seen as a surface relief, as non-glossy, mat areas and/or in the form of enclosed, totally reflecting air spaces.

10. The method as in claim 3, wherein the shape and size of the depressions, on the one hand, and the laminating conditions and properties of the material of the synthetic layers, on the other hand, are coordinated with each other in such a way that the material of the second synthetic layer does not completely fill in the depressions in the first synthetic layer when it flows into them, so that the patterns or numbers may be felt or seen as a surface relief, as nonglossy, mat areas and/or in the form of enclosed, totally reflecting air spaces.

11. A method of producing an identification card comprising the steps of providing at least two layers of synthetic material, said layers differing with respect to transparency and softening temperature;

providing at least one surface of the layer having the higher softening temperature with a relief structure without throughgoing openings, said structure corresponding to a pattern or characters and said relief structure being provided by either excavation or deformation of said layer up to a certain depth;

providing the layer having the lower softening temperature with a printed pattern;

superposing said at least two layers such that the at least one surface of the layer being provided with said relief structure is adjacently situated to said layer having the lower softening temperature and such that said printed pattern is situated between said at least two layes;

applying heat and pressure all over the surface of the layers for laminating said layers, wherein the heat is applied such that the temperature within the superposed layers during the laminating process is higher than the softening temperature of the layer having the lower softening temperature but said temperature being lower than the softening temperature of the layer being provided with said relief structure such that the layer having the lower softening temperature equalizes said relief structure by at least partially filling impressions of the surface relief structure and such that said printed pattern is distorted in accordance with said relief structure and such that the laminated structure has a constant thickness with respect to its outer dimensions, said layers having different transparencies locally varying with respect to the thickness such that when subjected to transmitted light the areas of greater thickness within the layer of less transparency appear to be darker than the surrounding areas whereas when subjected to incident light said areas having a higher color intensity than the surrounding areas, and wherein said layers are provided within said identity card such that said relief structure is covered at one face thereof only by transparent layers such that said relief structure and said distorted coating-pattern is visible from the outside of the card.

12. A method of producing an identification card comprising the steps of providing at least two layers of synthetic material, said layers differing with respect to transparency and softening temperature;

providing one surface of the layer having the lower softening temperature with a printed pattern;

providing said surface of higher softening temperature being provided with said pattern with a relief structure without throughgoing openings whereby said printed pattern is distorted in accordance with said relief structure;

superposing said at least two layers such that their surface being provided with said relief structure is adjacently situated to said layer having the lower softening temperature such that the printed pattern is situated between said two layers;

applying heat and pressure all over the surface of the superposed layers for laminating said layers, wherein the heat is applied such that the temperature within the superposed layers during the laminating process is higher than the softening temperature of the layer having the lower softening temperature but said temperature being lower than the softening temperature of the layer being provided with said relief structure such that the layer having the lower softening temperature equalizes said relief structure but at least partially filling impressions of the surface relief structure such that the laminating structure has a constant thickness with respect to its outer dimensions, said layers having different transparencies locally varying with respect to their thickness wherein said layers are provided within said identity card such that the relief structure is covered at one face thereof only by transparent layers such that said relief structure is visible from the outside of the card.

13. A method of producing an identification card comprising the steps of providing at least two layers of synthetic material, said layers differing with respect to softening temperature;

providing at least one surface of the layer having the higher softening temperature with a relief structure without throughgoing openings, said structure corresponding to a pattern or characters and said relief structure being provided by either excavation or deformation of said layer up to a certain depth;

providing one face of the layer having the lower softening temperature with a printed pattern;

superposing said at least two layers such that the at least one surface of the layer being provided with said relief structure is adjacently situated to said layer having the lower softening temperature and such that the printed pattern is situated between said two layers;

applying heat and pressure all over the surface of the superposed layers for laminating said layers, wherein the heat is applied such that the temperature within the superposed layers during the laminating process is higher than the softening temperature of the layer having the lower softening temperature but said temperature being lower than the softening temperature of the layer being provided with said relief structure such that the layer having the lower softening temperature equalizes said relief structure and simultaneously distorts said printed pattern in accordance with said relief structure by at least partially filling impressions of the surface relief structure such that the laminated structure has a constant thickness with respect to its outer dimension, said layers locally varying with respect to the thickness and wherein said layers are provided within said identity card such that said relief structure is covered at one face thereof only by transparent layers and such that said relief structure and said distorted coating-pattern is visible from the outside of this card.

* * * * *